2 Sheets--Sheet 1.
T. H. GARLAND.
Cultivators.
No. 156,847.     *Fig. 1.*     Patented Nov. 17, 1874.
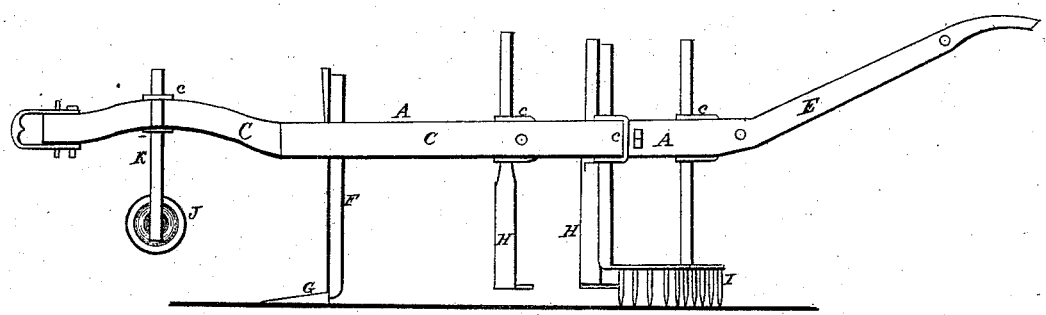
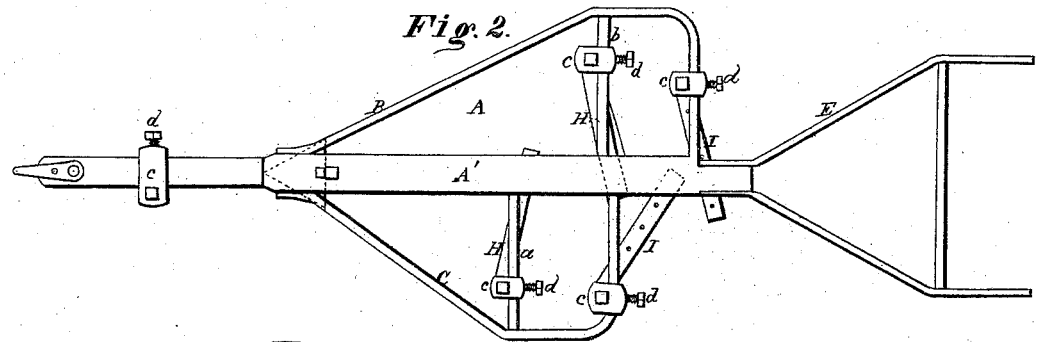
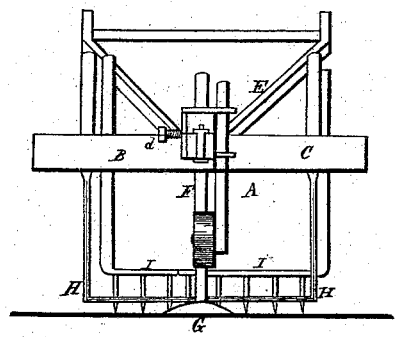
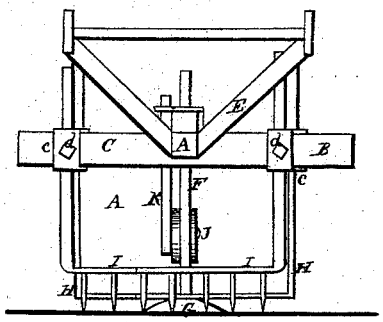
Witnesses.
A. F. Cornell
R. S. Stratton
Inventor.
Thomas H. Garland
Per. Burridge & Co.
Attys.
THE GRAPHIC CO. PHOTO-LITH. 39 & 41 PARK PLACE, N.Y.

2 Sheets--Sheet 2.

T. H. GARLAND.
Cultivators.

No. 156,847. Patented Nov. 17, 1874.

Witnesses.
A. F. Cornell
R. S. Stratton

Inventor.
Thomas H. Garland.
Per Burridge & Co.
Attys.

UNITED STATES PATENT OFFICE.

THOMAS H. GARLAND, OF WEST CLEVELAND, OHIO.

IMPROVEMENT IN CULTIVATORS.

Specification forming part of Letters Patent No. 156,847, dated November 17, 1874; application filed September 21, 1874.

*To all whom it may concern:*

Be it known that I, THOMAS H. GARLAND, of West Cleveland, in the county of Cuyahoga and State of Ohio, have invented certain new and useful Improvements in Cultivators, of which the following is a specification, reference being had to the accompanying drawings making a part of this specification, in which—

Figure 1 is a side view of the cultivator. Fig. 2 is a plan view. Fig. 3 is a view of the front end. Fig. 4 is a view of the rear end.

The figures on Plate 2 are views of detached sections and modifications thereof, to be used in connection with the frame of the cultivator, and forming a part of the same, to which reference will be had.

Like letters of reference refer to like parts in the several views.

This invention is for cultivating the soil; and consists of a metallic frame, having attached thereto in an adjustable manner a pair of rakes; also, a pair of cutters and a share or plow, with modification of the same, whereby the ground is furrowed, the grass and weeds cut up, and the surface of the ground raked over and leveled by the rakes.

Figure 8:
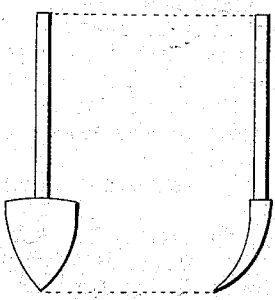
Figure 10:
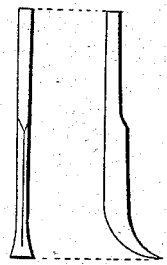
Figure 11:
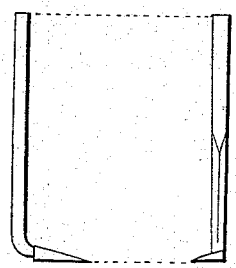

Of the aforesaid invention the following is a description in detail: The frame A of the cultivator consists of the beam A', Fig. 2, and projecting sides B C, to which are secured the handles E. Near the front end of the beam is secured a standard, F, provided with a share or foot, G, a detached view whereof is shown in Fig. 11, of which Figs. 8 and 10 are slight modifications. To the bars $a$ $b$ of the sides are secured a pair of rectangular cutters, H H, Fig. 2, each of which have sharp-cutting, horizontal, and vertical edges. Said cutters are fastened to the bars by clamps $c$, embracing the bars, and through the projecting ends of the clamp the shanks of the cutters pass, which are then drawn hard against the side of the bars by the set-screws $d$, thereby clamping the stems or shanks of the cutters firmly and securely to bars of the frame, as shown in Fig. 2. In rear of the cutters referred to is secured in like manner to the frame a pair of rakes, I I, Figs. 1 and 4. To the front end of the beam is attached a roller, J, by a hanger, K, secured to the beam by a clamp and set screw, as above described.

The practical operation of the cultivator is as follows: As it is drawn along between the rows of plants the share G loosens up the dirt while the cutters H cut or tear up the roots of grass, weeds, &c. The roughened ground is now leveled down and smoothed by the rakes I I, thereby leaving the ground well stirred by the share G, and the weeds cut up by the cutters H H and raked smoothly down by the rakes.

Figure 5:
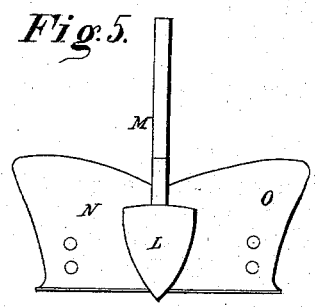
Figure 6:
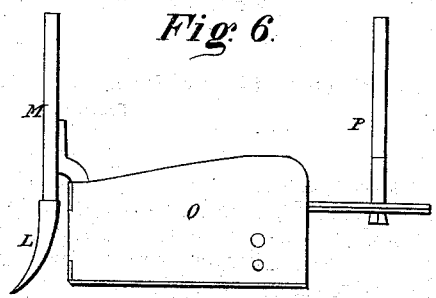
Figure 7:
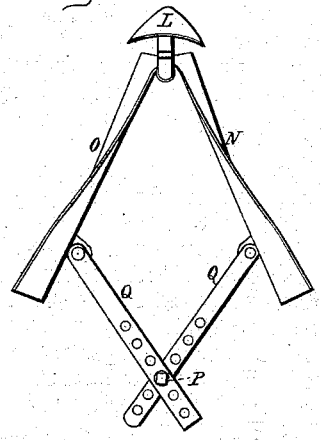

The cultivator can be adapted to wide or narrow rows of plants by loosening the set-screws $d$, and adjusting the cutters and rakes accordingly. In the event it should be necessary to throw the dirt around the plants the share-cutters and rakes are removed, and in place of them is used the share L attached to the standard M, a much larger share than the one removed. To the standard of said share is hinged a pair of adjustable wings or mold-boards, N O, Figs. 5, 6, and 7, whereby the dirt loosened up by the share is thrown against the sides of the plants. As the wings are adjustable they can be spread out or closed up as the width of the rows may need by shifting the standard P in the holes of the braces $g$.

The figures shown in Figs. 8, 10, and 11 are modifications of the share, which may be used separately from the share L and wings.

Figure 9:
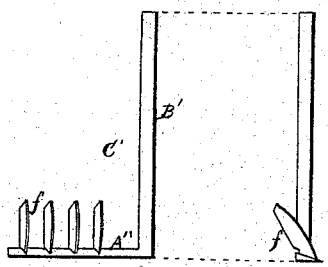

When the condition of the ground requires it to be broken and cut up, rather than raked over and leveled, the rakes I I should be removed and the slicers C', Fig. 9, be used in place of them. It will be observed that the slicers consist of a horizontal arm, A'', which (as also the standard B') has a sharp cutting-edge. From the face of the arm projects upward a series of blades, $f$, having cutting-edges. The slicer runs in the ground, cutting horizontally by means of the arm and vertically by the blades.

In tough, grassy ground, and such as abounds with roots, the slicer is a useful tool, as it leaves the ground open and loose for the action of the shares and rakes.

What I claim as my invention, and desire to secure by Letters Patent, is—

The triangular frame A, constructed in the shape described and shown, the handles E, and braces *a a*, the whole made of one piece of metal, and adapted to carry a shovel-plow having adjustable wings, or various forms of cultivator-blades, with horizontal cutters and rakes, substantially as and for the purpose set forth.

THOMAS H. GARLAND.

Witnesses:
 W. H. BURRIDGE,
 E. HESSENMUELLER.